US006882609B2

(12) United States Patent
Williams et al.

(10) Patent No.: US 6,882,609 B2
(45) Date of Patent: Apr. 19, 2005

(54) HEADER DETECT CONFIGURATION WITHIN A DVD-RAM READ DEVICE AND METHODS OF ACQUIRING AND MAINTAINING PHASE LOCK IN A WOBBLE PHASE LOCK LOOP

(75) Inventors: Stephen Williams, Manchester (GB); David I. Boddy, Rawtenstall (GB); Nicholas A. I. Mihailovits, Sale (GB)

(73) Assignee: LSI Logic Corporation, Milpitas, CA (US)

( * ) Notice: Subject to any disclaimer, the term of this patent is extended or adjusted under 35 U.S.C. 154(b) by 338 days.

(21) Appl. No.: 10/002,672

(22) Filed: Oct. 23, 2001

(65) Prior Publication Data

US 2003/0095481 A1 May 22, 2003

(30) Foreign Application Priority Data

Oct. 25, 2000 (GB) ............................................. 0026105

(51) Int. Cl.[7] .............................................. G11B 5/09
(52) U.S. Cl. ................. 369/47.48; 369/53.24; 713/503
(58) Field of Search ......................... 369/44.28, 47.48, 369/47.31, 53.24; 713/503

(56) References Cited

U.S. PATENT DOCUMENTS 6,088,311 A * 7/2000 Katoh ..................... 369/47.18
6,172,952 B1 * 1/2001 Inokuchi et al. ......... 369/44.32
6,333,902 B1 * 12/2001 Shim ....................... 369/47.54
6,657,929 B1 * 12/2003 Minamino et al. ....... 369/44.13
6,683,830 B1 * 1/2004 Eom ....................... 369/44.13
6,747,932 B1 * 6/2004 Jeon ........................ 369/53.24

* cited by examiner

Primary Examiner—A M Psitos
(74) Attorney, Agent, or Firm—Christopher P Maiorana PC (57) ABSTRACT

In the context of a DVD-RAM read-type architecture in which an optical storage medium (20) makes use of an eccentric wobble (164) to attain synchronisation information, a wobble PLL (179) is held in an acquired state whenever header regions (32, 33) embossed at regular intervals across the optical storage medium (20) are detected. More specifically, large dc variations associated with voltage spikes caused by header regions (32, 33) are scaled (260) relative to a dynamically varying amplitude envelope of the extracted wobble signal (164), such as to identify a start location (300) for each header region. The wobble PLL (179) is effectively allowed to free-run and hold state during periods of header, thereby mitigating the likelihood that the wobble PLL will loose lock during the header regions. Also, with suspension of the wobble PLL triggered by a first spike (300), a counter is initiated to over-sample wobble clock periods to pre-empt a successive header and such that the PLL can be disabled immediately prior to the successive header region. Use of a bandpass filter (156) to extract the wobble signal (164) benefits from generation of a spike at each transition of the header dc level, which spike can be used as a definitive marker for a header region.

18 Claims, 8 Drawing Sheets

HEADER DETECT CONFIGURATION WITHIN A DVD-RAM READ DEVICE AND METHODS OF ACQUIRING AND MAINTAINING PHASE LOCK IN A WOBBLE PHASE LOCK LOOP

This application claims the benefit of United Kingdom Application No. 0026105.7 filed Oct. 25, 2000.

FIELD OF THE INVENTION

The present invention relates generally to a mechanism and apparatus for acquiring phase lock for data read and write purposes and more particularly, but not exclusively, to phase lock loops (PLLs) in optical data media, such as in the context of digital versatile disc random access memory (DVD-RAM). More especially, the present invention relates to phase acquisition and lock obtained from sinusoidal data tracks of a DVD-RAM read channel that are punctuated into data sectors by header information providing address and location information for the optical disc.

BACKGROUND OF THE INVENTION

In conventional storage of data on optical storage media, such as on compact disc read only memory (CD-ROM) and DVD-RAM, a selected form of modulation encodes data into the surface of the media. In the context of DVD-ROM or DVD-RAM, an eight-fourteen modulation (efm) scheme is used to encode binary data through data "pits" that are either magnetically or optically inscribed within, or manually embossed/stamped on, the surface of the optical storage medium and undisturbed mirror regions. The length of the pit or complementary mirror is indicative of the encoded binary information, subject to there being no defects associated with the formation of the pit or mirror.

In a DVD-RAM, data segments (or sectors) spiral outward from a center of the optical storage medium. The data segments are also indexed by a header that is embossed (i.e., physically stamped) onto the surface of the optical storage medium. The header provides address and location information, such as track and sector numbers. The headers are individually indexed at the beginning of the disc for use in scanning. The headers have a precisely defined width dimension and are separated by a data sector of defined length. Furthermore, the headers appear in pairs that are physically offset from one another relative to a central datum within each track. Each pair of headers is generally followed by an extended mirror region of maximum reflectivity.

From a perspective of data recovery, once on-track, an array of photodiodes, typically four, is used to recover the information stored on the medium. The four photodiodes provide an output voltage that varies according to an amount of reflectivity from the surface of the medium. More particularly, laser light is reflected from the marks and spaces, with a data pit (i.e., a mark) providing an inferior reflectivity and hence a lower voltage than a space (that provides maximum reflectivity and hence maximum voltage).

Data encoding for DVD-RAM is further complicated by the structure employed within the readable/writeable medium. In addition to the spiraling and sectorized nature of the modulation data, the marks and spaces are produced within adjacent "lands" and "grooves" that provide a distinct three-dimensional profile to a cross-section of the optical storage medium. The lands and grooves also constitute "tracks" within the storage medium. Moreover, the lands and grooves exhibit a sinusoidal oscillation known as "wobble" which has a frequency of about 157 kHz at a 1×rate, which is typically lower than the rate of the efm data. The wobble, which is stamped into the optical storage medium, provides speed of rotation information that is critical for operation control of data read and data write functions. A frequency of the wobble is implemented for phase acquisition in a phase lock loop. More specifically, the wobble frequency provides a synchronized write clock having a known linear density of information. Unfortunately, the embossed header regions entirely disrupt (or break) the continuous sinusoidal oscillation of the wobble. The wobble simply does not co-exist with header regions. The loss of the wobble signal adversely affects phase acquisition, PLL function and device operation.

In contrast with efm data extraction that takes a sum of the four photodiodes, wobble extraction utilizes a "push-pull" signal obtained from the numeric subtraction of adjacent photodiode levels, namely the algebraic expression (A+B)−(C+D) where A, B, C and D are a sequence of adjacent photodiodes in a configuration of a square. For completeness, low pass filtering of the push-pull signal eliminates high frequency noise, such as produced from read frequency feed-through and any mismatches in, for example, amplification paths, to produce an appropriate signal from which a clock can be derived. As will be understood, in the ideal case, read frequency errors should be negligible (if not zero). However, in practice errors are induced by inaccuracies in the laser and detector alignment with respect to a center of a particular track on the optical medium. Low frequency noise is generally present as a consequence of introduction by processing and physical properties such as non-planar disc profiles, disc eccentricity, changes in reflectivity and errors in the servo-drive system for control of the laser and detector heads. Existing systems that utilize low pass filters for wobble recovery are unable to filter out such low pass noise, since the wobble signal is relatively dirty and interpretational errors may be induced.

As will be understood, when the array of photodiodes encounters each associated pair of headers, the photodiodes produce a maximum or minimum DC deflection (relative to efm data) in the push-pull signal. Moreover, the headers produce an indeterminate number spikes within the push-pull signal. A transition between each header in the pair also generates a reversal in the DC deflection. The relative polarity between spikes in the bandpass filtered push-pull signal caused by the headers provides an indication on whether a succeeding data sector appears on a land or a groove. The polarity information is necessary to instruct the PLL to perform a phase inversion. For completeness, it will be understood that the phase inversion (i.e., a 180° phase shift) always occurs at a transition between data sectors on lands and grooves.

In summary, DVD-RAM read/write operations require a clock to be generated which is phase lock ed to the wobble signal derived from a readback (or read channel) signal produced by spinning of the optical disc. The wobble is derived from an eccentricity deliberately produced in the track structure of DVD-RAM discs. The eccentric wobble is, however, not continuous and is broken up by embossed header regions (containing track addressing information). Therefore, phase locked loops (PLLs) attempting to lock onto the wobble signal are generally subject to loss of lock during header periods.

SUMMARY OF THE INVENTION

A first aspect of the present invention concerns a method of synchronizing a phase lock loop to an intermittent clock signal applied thereto, the method comprising the steps of (i) seeking to acquire phase lock during periods of the intermittent clock and (ii) holding the phase lock loop in a free-running state during periods when the intermittent clock is absent. Additionally, frequency lock may be acquired in an asynchronous mode.

In one particular embodiment, the intermittent clock signal is derived from a geometric eccentricity associated with a track on an optical disc. The geometric eccentricity is generally interspersed by regularly spaced header regions that disrupt the geometric eccentricity.

The method may further comprise the steps of (i) timing a duration of the intermittent clock signal and (ii) placing the phase lock loop in the free-running state in anticipation of an arrival of a header in response to an elapsed duration of the clock signal.

In one example the method may also include (i) identifying re-emergence of the clock signal and (ii) seeking to acquire phase lock only after re-emergence of the clock signal has been validated.

The method may also include the steps of (i) estimating a signal envelope for the clock signal, (ii) bandpass filtering the header region to generate a spike indicative of a header transition, (iii) amplifying the signal envelope and the spike to scale the spike relative to the signal envelope, thereby to differentiate in level the signal envelope from the spike, (iv) defining a threshold exceeding, in absolute magnitude, the signal envelope, and (v) identifying commencement of a header region by equating a first spike transition through the threshold as being indicative of the header region.

In another example, the method may identify a relative signal level polarity between a first spike and a successive spike to identify a requirement for a phase reversal. A particular embodiment may filter the clock signal in a low pass filter to generate an adaptive slice level signal capable of tracking residual near-DC variations in the clock signal.

Another aspect of the present invention supports the underlying mechanism in a computer program element comprising appropriate computer program code arranged to make a controller implement procedure to perform the method of the various embodiments previously described above.

In a further aspect of the present invention a control circuit may be coupled, in use, to a phase lock loop arranged to receive an intermittent clocking signal to which the phase lock loop is to be synchronized. The control circuit may maintain operation control of the phase lock loop. The circuit generally comprises a circuit configured to determine periods of time when the clocking signal is deemed stable; a circuit configured to selectively maintain the phase lock loop in a phase acquisition state during the periods of time; and a circuit configured to force the phase lock loop to enter a free-running state during periods when the clocking signal is absent or deemed not to be stable.

The intermittent clock signal may be derived from a geometric eccentricity associated with a track on an optical disc. The geometric eccentricity is interspersed by regularly spaced header regions that disrupt the geometric eccentricity. The header regions each define a data sector. The circuit may further include a counter arranged to time the intermittent clocking signal during each data sector. The forcing circuit may be operationally responsive to time elapsed within each data sector such that the phase lock loop is placed in the free-running state, based on time elapsed, in advance of an arrival of a header. A detector may be arranged to identify emergence of a steady state in the clocking signal. The forcing circuit may be operationally disabled by the detector in response to the steady state.

In a particular embodiment, there is provided a top hold feedback circuit, a bandpass filter, an amplifier configuration, a data slicing circuit, and comparator arrangement. The top hold feedback circuit may be arranged to estimate a signal envelope for the clock signal. The bandpass filter may be coupled to receive the clocking signal and may be arranged to filter the header region to generate a spike indicative of a header transition. An amplifier configuration may be arranged to amplify the signal envelope and the spike thereby to scale the spike relative to the signal envelope to differentiate in level the signal envelope from the spike. The data slicing circuit may define a threshold exceeding, in absolute magnitude, the signal envelope. The comparator arrangement may be configured to identify commencement of a header region by equating a first spike transition through the threshold as being indicative of the header region.

The comparator arrangement preferably comprises first and second comparators respectively configured to process opposite signal senses from the signal envelope. The first and second comparators may each provide an output to a controller arranged to identify therefrom the relative signal level polarity between a first spike and a successive spike thereby to identify a requirement for a phase reversal in the phase lock loop. A low pass filter, responsive to filtering the clocking signal, may be arranged to generate an adaptive slice level signal capable of tracking residual near-DC variations in the clocking signal.

In yet another aspect of the present invention there is provided a DVD-RAM read channel comprising an array of photodiodes and a bandpass filter. The array of photodiodes may be configured to recover a push-pull signal representation from an optical disc containing data segments interspersed with header regions. The bandpass filter may be coupled to receive the push-pull representation. The bandpass filter may be operational to filter the header region to generate a spike indicative of a header transition. The DVD-RAM read channel may include a low pass filter responsive to a wobble signal emanating from the bandpass filter. The low pass filter may be arranged to generate an adaptive slice level signal capable of tracking residual near-DC variations in the wobble signal.

In an embodiment, the DVD-RAM read channel further comprises a top hold feedback circuit, an amplifier configuration, data slicing circuit, and a comparator arrangement The top hold feedback circuit may be arranged to estimate a signal envelope for the clock signal. An amplifier configuration may be configured to amplify the signal envelope and the spike thereby to scale the spike relative to the signal envelope to differentiate in level the signal envelope from the spike. The data slicing circuit may define a threshold exceeding, in absolute magnitude, the signal envelope. The comparator arrangement may be configured to identify commencement of a header region by equating a first spike transition through the threshold as being indicative of the header region.

Advantageously, the present invention provides an improved lock acquisition system for use with DVD-RAM and the like that utilizes eccentric track wobble to provide clock and synchronization information. More specifically, the architecture and mechanism employed by the various embodiments of the present invention may increase the rate at which lock can be obtained. The system is considerably robust and is arranged to anticipate loss of the wobble signal to suspend potentially significant and detrimental changes to an acquired phase scenario. The present invention provides predictive digital control with respect to approaching header regions. Furthermore, the present invention includes the beneficial use of a bandpass filter configured to receive a push-pull signal, taking advantage of the DC offset present in the push-pull signal in the header regions.

The present invention is further capable of handling both land and groove-type headers by virtue of reacting in identical fashion (e.g., the trigger points on the recovered wobble signal are in opposite DC senses). The present invention is beneficially capable of determining whether or not the header region and following sector is of a land or groove type. Advantageously, the present invention reliably detects header regions and operates to switch-out, freeze-out and generally suspend operation of the wobble PLL, thereby limiting disruption to phase acquisition and phase maintenance during, respectively, asynchronous operation of the wobble PLL (when the PLL is attempting to acquire lock) and synchronous operation (when the wobble PLL is attempting to maintain lock).

BRIEF DESCRIPTION OF THE DRAWINGS

These and other objects, features and advantages of the present invention will be apparent from the following detailed description and the appended claims and drawings in which:

DETAILED DESCRIPTION OF A PREFERRED EMBODIMENTS

Figure 1:
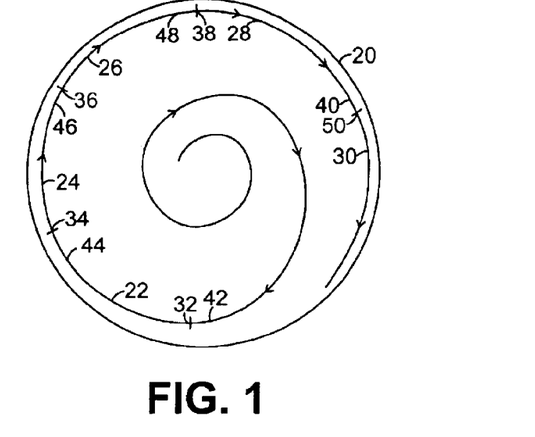
FIG. 1 is a representation of an optical disc.
Figures 2, 3:
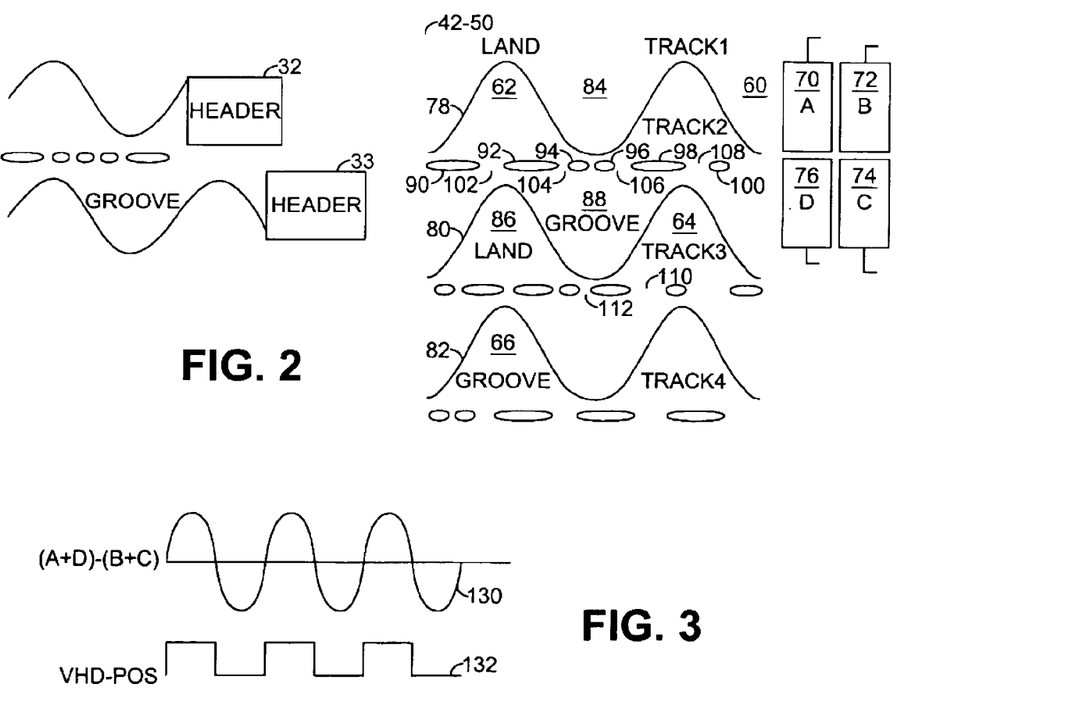
FIG. 2 illustrates, in some detail, a structure of the optical disc of FIG. 1 and a relationship between tracks on the disc and photodiodes designed to recover reflected laser light.
FIG. 3 illustrates a relationship between a push-pull signal and a recovered clock.
Figure 4:
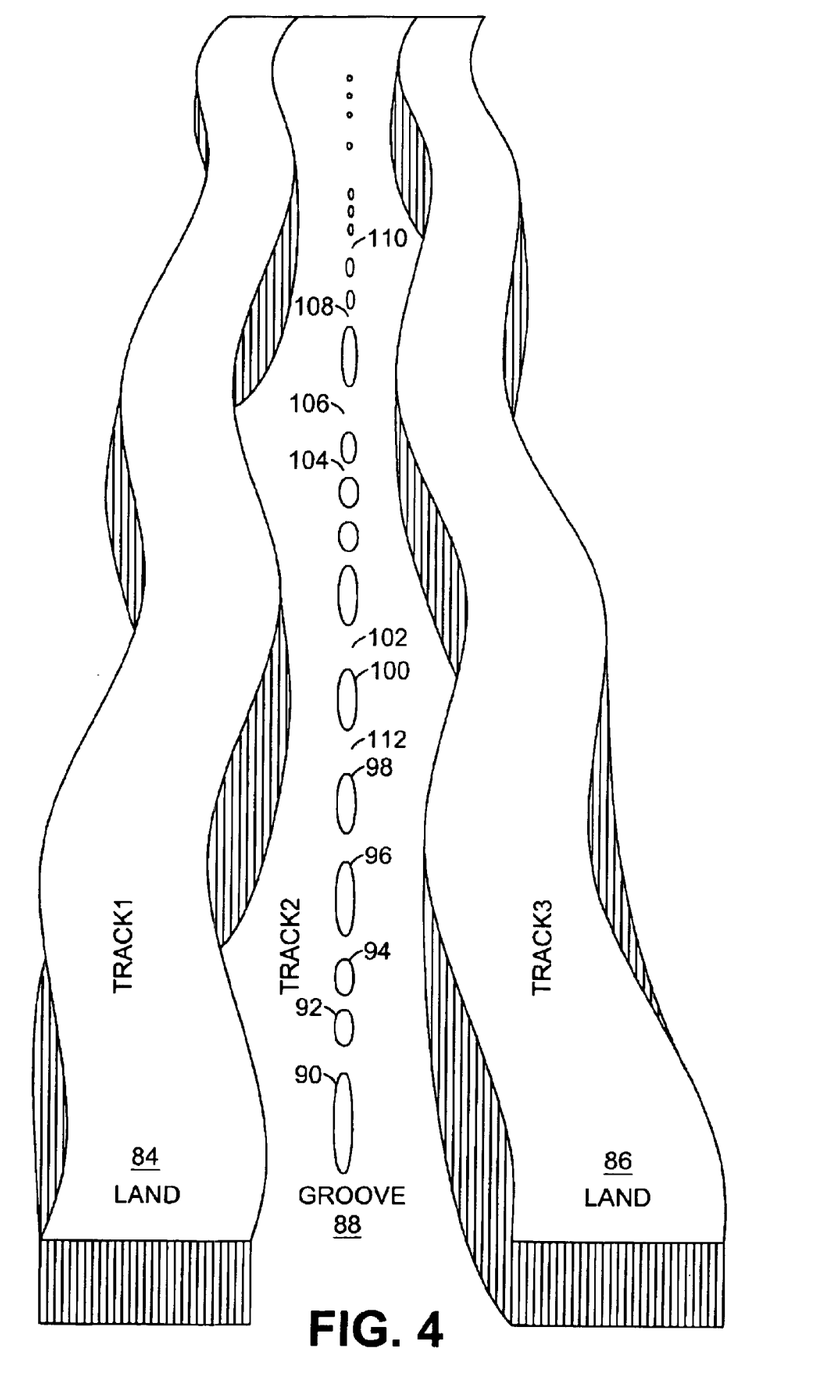
FIG. 4 is a perspective view of tracks exhibiting wobble in a DVD-RAM.

FIG. 1 is a representation of an optical disc 20 showing a spiraling nature (greatly exaggerated) of data segments 22–30 outward from a center of the disc 20. A number of headers 32–40 are diagrammatically represented at the beginning of each data segment 22–30, with each header preceded by a mirror 42–50. FIG. 2 illustrates a structure of the optical disc 20 of FIG. 1 and a relationship between tracks 60–66 (e.g., track 1, 2, 3, 4) on the disc 20 and photodiodes 70–76 designed to recover reflected laser light (not shown). The photodiodes are shown positioned generally centrally with respect to a particular track (e.g., groove "track 2", reference numbers 62, 88). More particularly, each track 60–66 is bounded by a wobble eccentricity 78–82 which defines an area of land 84–86 or groove 88 (better illustrated in FIG. 4). Modulated data, in the form of pits 90–100 and gaps 102–112, is written substantially at the center of each track 60–66. As can be seen in FIG. 2, a pair of headers 32, 33 interrupt the continuous flow of the wobble eccentricity 78–82 defining a track 60–66, with the headers 32, 33 followed by a region of mirror 42–52. Additionally, FIG. 3 illustrates a relationship between a push-pull signal 130 and a recovered clock 132.

Figure 5:
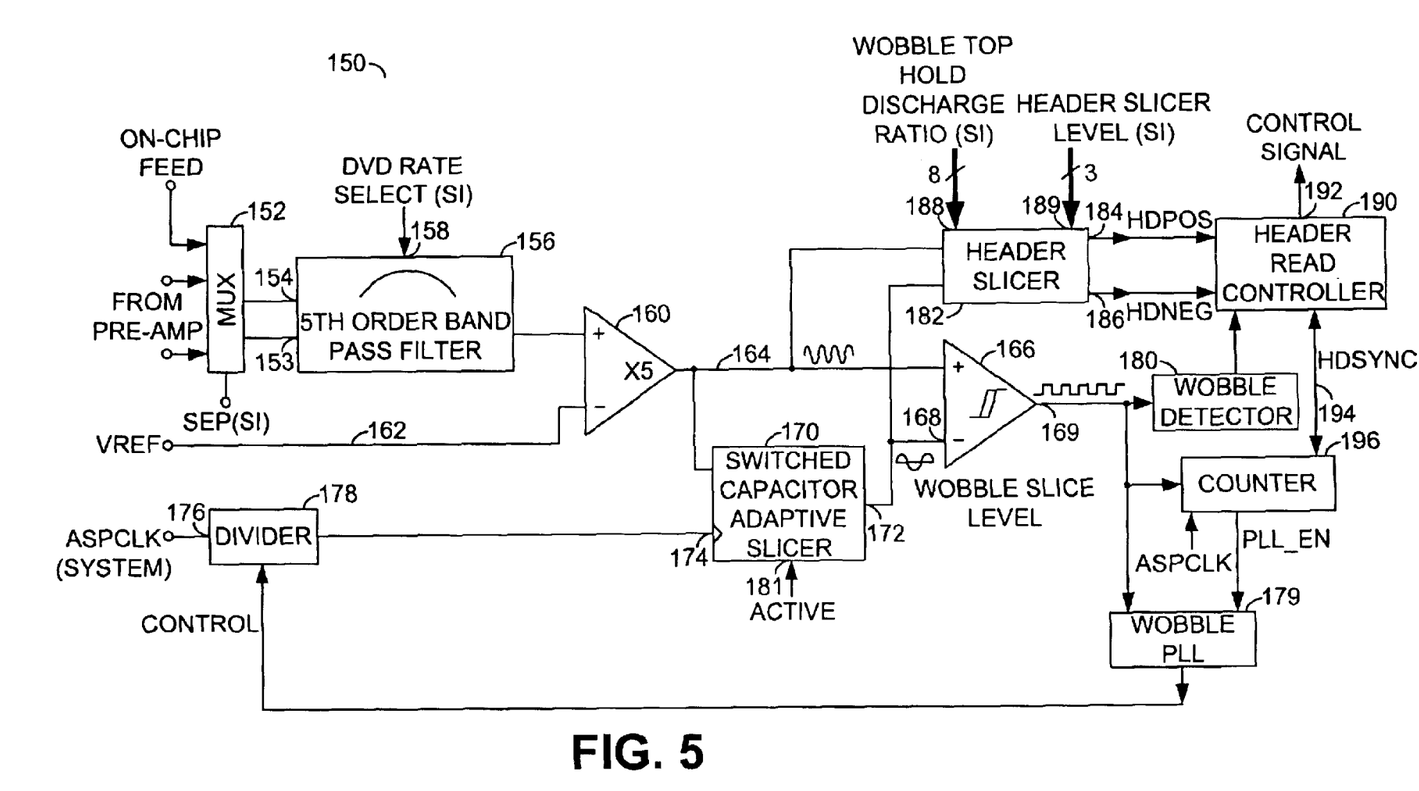
FIG. 5 is a block diagram of wobble signal generation circuitry according to a preferred embodiment of the present invention.

Referring to FIG. 5, a block diagram of a circuit 150 is shown. In one example, the circuit 150 may be implemented as a wobble signal generation circuit. The wobble generation circuit 150 is shown having an optional mulitplexer 152 that allows the circuit 150 to acquire an acquired push-pull signal 153–154 from either a suitably configured pre-amplifier or from an integrally formed on-chip function. A multiplexer (MUX) 152 provides a user with an ability to select the source of the error signal (e.g., an external or internal push-pull signal). A push-pull signal 153–154 (illustrated as a dual input) is applied to a band pass filter 156, preferably having at least a fifth order characteristic. The bandpass filter is responsive to a rate selector function 158 that selects a speed of operation (e.g., 1×, 2×, 4×, 8×) of the circuit 150. An output from the bandpass filter 156 is coupled to a positive input of a differential amplifier 160, with an inverting input of the differential amplifier arranged to receive a reference voltage (e.g., VREF) 162, which, in one example, is approximately 2.5 volts. The differential amplifier 160 provides a substantially sinusoidal wobble signal 164 having a workable peak to trough signal level. Hence the differential amplifier 160 typically supports an amplification factor of approximately 5.

The wobble signal 164 is applied as a first input to a hysteresis comparator 166 that acts to provide a square wave output 169 representative of the wobble signal 164. The extracted wobble signal 164 is further filtered by a low cut-off low pass filter 170 to generate an adaptive slice level signal 172 which is capable of tracking any residual near DC variations in the wobble signal. The adaptive slice level signal 172 is applied as a threshold control input to the hysteresis comparator 166. The low cut-off low pass filter 170 is preferably implemented as a switched capacitor filter. The adaptive slice level signal 172 is configured to determine an optimum level about which the wobble is judged. The optimum level is generally symmetrical with respect to a mark-space ratio.

The cut-off low pass filter 170 is provided with a first control input that is a function of a system clock (e.g., ASPCLK) 176. The control input is generally managed by an adjustable divider circuit 178 that essentially controls the cut-off of the low pass filter 170 in response to operation of a PLL 179 associated with the wobble. A second control input (e.g., "active") 181 acts to activate/deactivate the filter 170 in the identified presence of a header. For example, the filter is disabled when a header is detected, whereby the second input is set low to deactivate the cut-off low pass filter 170. The square wave output 169, in addition to being provided to the PLL 179 associated with the wobble, is also applied to wobble detection logic 180 will be described subsequently.

In addition to providing a threshold control input to the hysteresis comparator 166, the adaptive slice level signal 172 is also applied to a header slicer circuit 182 that also receives the wobble signal 164 as an input. The header slicer circuit 182 provides control outputs (or header region detection signals, HDPOS 184 and HDNEG 186) that are pulsed with each large signal excursion beyond a magnitude of a wobble envelope (to be described in more detail in relation to FIGS. 7 and 8). The header slicer circuit 182 is responsive to two further control inputs shown as parallel buses providing control data words to the header slicer circuit 182. The wobble top hold discharge ratio control 188 and the header slicer control level 189 will be described subsequently.

The signals HDPOS 184 and HDNEG 186 pulses are provided to a header read controller 190 that is further responsive to the wobble detector 180. The header read controller 190, besides providing a control output 192 for ancillary circuitry, also provides a further output 194 (e.g., HD_SYNC) to a counter 196. The wobble PLL 179 is operationally responsive to the header read controller 190. The wobble PLL 179 is effectively controlled, in a preferred embodiment, by an output PLL_EN signal emanating from the counter 196.

The bandpass filter 156 replaces the low pass filter in conventional DVD-RAM circuits. The bandpass filter 156 operates to reject both high frequency and low frequency noise from the incoming push-pull signal 153, 154 but is pitched to allow the wobble signal 164 (which is embedded in the push-pull signal) to pass through. Furthermore, the bandpass filter 156 (as opposed to a low pass filter) causes a spike at each transition of the header DC level. The affect of bandpass filtering the push-pull signal 153, 154 in the generation of the wobble signal is shown in FIG. 6.

It will be appreciated that offsets in the bandpass filter 158 and amplifier 160 configuration will generally cause the resultant wobble signal 164 not to be centered on the reference voltage VREF 162. Consequently, the low pass filter 170 is used to generate the slice level to take account of DC errors. Consequently, the circuitry could be simplified with removal of the low pass filter chain. However, removal of the low pass filter chain may be detrimental to operational performance, since such removal would assume centralized location of the wobble signal. The bandpass filtering scheme employed in a preferred embodiment therefore avoids error frequency components. Additionally, read frequency data associated with the header is destroyed by the process of bandpass filtering.

The wobble detection logic 180 is configured to identify periods when the system is actually in data segments, as opposed to header and mirror regions. The wobble detection logic 180 is configured to measure the periods between transitions by over-sampling with a high-speed clock such that identification of a predetermined number of periods within a given tolerance is adjudged to be representative of a valid period of wobble in a data sector.

Figure 6:
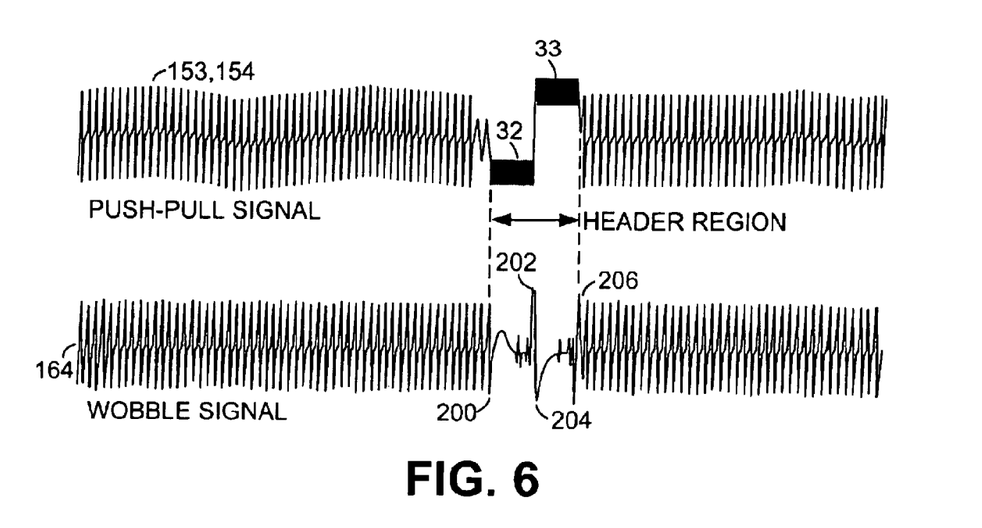
FIG. 6 is a timing diagram illustrating a relationship between a push-pull signal and a wobble signal obtained therefrom.

Briefly referring to FIG. 6, a general correspondence between the push-pull signal 153, 154 and the derived wobble signal 164 is shown. However, looking specifically to the header regions, large DC offsets 200–206 (e.g., signal excursion spikes) occur at the transition into, out of and between headers 32, 33. Intermediate to the spikes 200–206 are regions of spurious noise that must be disregarded. The present invention may only recognize the initial spike 200 to identify a header region. The reminder of the headers may therefore contain an indeterminate number of spikes and with differing DC offsets.

Figure 7:
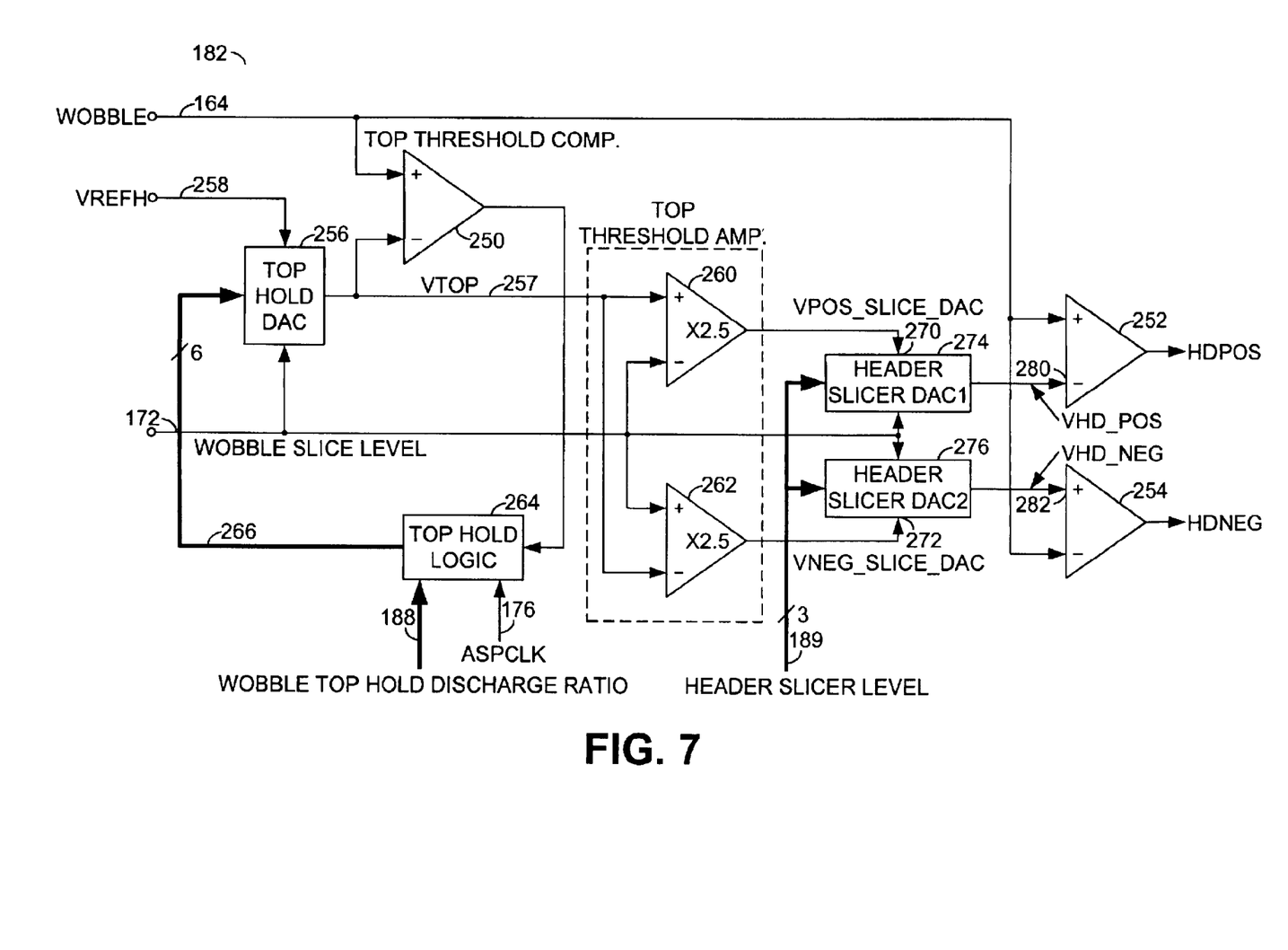
FIG. 7 is a block diagram of a header slicer circuit according to a preferred embodiment of the present invention.

FIG. 7 is a block diagram of a header slicer circuit 182 according to a preferred embodiment of the present invention. The header slicer circuit 182 takes advantage of the fact that a DC offset exists in the wobble signal during the header regions. The wobble signal provides both a positive input to a top hold comparator 250 and first inputs to header positive level HDPOS and header negative level HDNEG comparators 252 and 254, respectively. A top hold digital to analog converter (DAC) 256 receives a reference voltage (e.g., VREFH) 258 that, in one example, is selected to be equal to approximately VREF+VREF/2.5. An output (e.g., VTOP) 257 from the top hold DAC 256 provides first inputs to parallel top threshold amplifiers 260–262. The threshold amplifiers 260–262 provide amplification of the signal VTOP thus providing positive and negative (relative to the wobble slice level) references for the header slicer DACs 274–276. The top hold DAC 256 also receives the wobble slice level 172 as an input, and the top threshold amplifiers 260–262 also receive the wobble slice level 172 as respective second inputs. An output from the top threshold comparator 250 is looped back through top hold logic 264 to provide a control data word 266 to the top hold DAC 256. The top hold logic 264 is responsive to the system clock ASPCLK 176 and the wobble top hold discharge ratio control word. The top hold logic 264 may act to find the output VTOP and operate to accelerate the top hold DAC 256 to the output VTOP level. The top threshold amplifiers 260–262 are selected to amplify respective input signals by a predetermined factor (preferably 2.5). However, the amount of amplification is arbitrary and merely sufficient to cover an anticipated range spike 200–206 voltage levels. Conceivably, the top threshold amplifier could be implemented as a single amplifier having a switchable input source. However, a complementary pair of amplifiers is conceptually more easily understood.

The feedback loop produced by the combination of the top hold DAC 256, the output of the top threshold comparator 250 and the top hold logic 264 operate to perform a convergence such that an output voltage VTOP is equal to the peak output of the wobble envelope. The wobble top discharge ratio, as will be understood, generally provides an auto discharge capability that tracks degradation in the wobble signal level. The wobble top discharge ratio controls a rate at which the peak voltage will decay during any absence of an input signal, taking into account the fact that the output VTOP 257 will generally always decay. The header slicer circuit 182 is self-adjusting in nature to take into account slow variations in the envelope amplitude of the wobble signal 164.

Respective outputs of the top threshold amplifiers 260, 262 provide first control signals 270, 272 (e.g., VPOS_SLICE_DAC and VNEG_SLICE_DAC) to first and second header slice DACs 274, 276, respectively. The first and second headers slice DACs 270, 272 also receive (as control inputs) the header slicer level 189 and the wobble slice level 172. An output (e.g., VHD_POS) 280 from the first header slicer DAC provides a second input to the header positive level HDPOS comparator 252, whereas an output (e.g., VHD_NEG) 282 from the second header slicer DAC 276 provides a second input to the header negative level HDNEG comparator 254. The configuration of the header slicer 182 ensures that each spike in each header generates an output pulse (HDPOS or HDNEG) at the outputs of the respective header positive level HDPOS comparator 252 or the header negative level HDNEG comparator 254. Additionally, the header slicer level 189 is a control parameter that sets the threshold at which the header slicer comparator triggers.

The feedback loop comprising the top threshold comparator 250, top hold logic 264 and top hold DAC generates a voltage, the output VTOP 257, which will converge to a value equal to the peak amplitude of the wobble signal 164. The output VTOP signal 257 will be amplified both in a positive sense to generate another voltage VPOS_SLICE_DAC, and in a negative sense to generate a voltage VNEG_SLICE_DAC. The voltages VPOS_SLICE_DAC and VNEG_SLICE_DAC may be equal in magnitude but opposite in sign and symmetrical around the wobble slice level voltage 172. The two header slice DACs 274–276 (e.g., Header Slicer DAC1 and Header Slicer DAC2) are used to generate a pair of voltages, VHD_POS and VHD_NEG which are bounded by: (i) VPOS_SLICE_DAC; (ii) wobble slice level+VTOP; (iii) VNEG_SLICE_DAC; and (iv) wobble slice level−VTOP. The exact level of VHD_POS and VHD_NEG, within these bounds, is determined by a user controlled parameter (e.g., Header Slicer Level 189). The levels of VHD_POS and VHD_NEG are selected to sit at a level, which is crossed by the peaks in the bandpass filtered wobble signal (resulting form a high rate of change in the DC level that exist in the push-pull signal at the header region boundaries), but not crossed by the wobble signal elsewhere.

Figure 8:
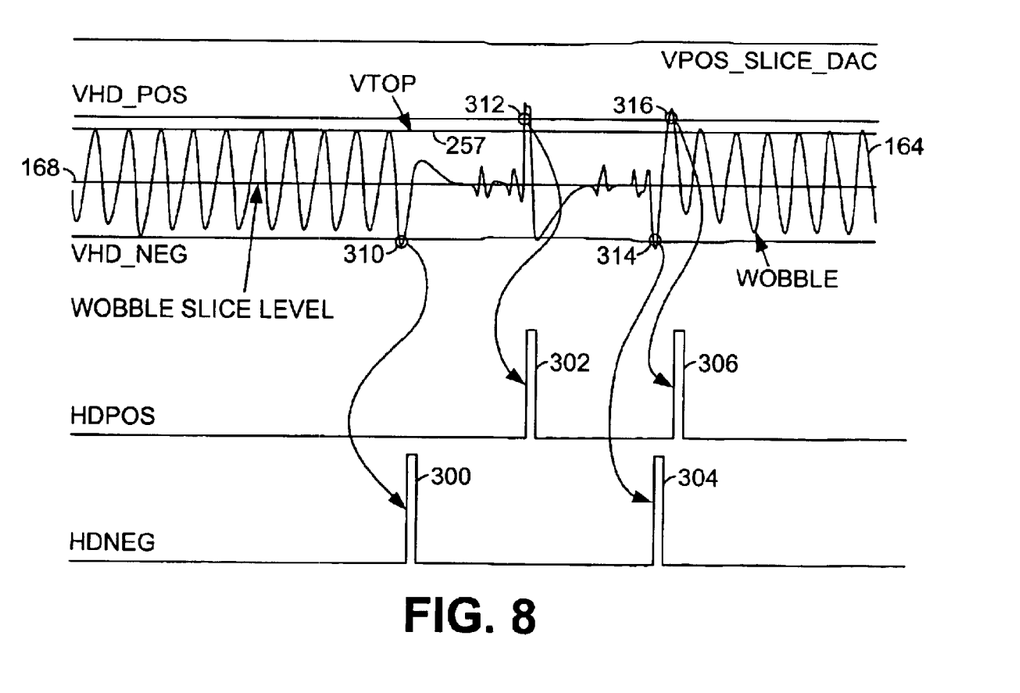
FIG. 8 is illustrative of a preferred header detection mechanism of the present invention.

Referring to FIG. 8, the details of the signal relationships within the header detection circuitry are shown. The signals are produced by the header slicer circuit 182. The start of each header region 32, 33 can be determined by a pulse 300–306 on either of the outputs HDPOS or HDNEG. By way of providing a preferred, but exemplary, scaling for the various voltages, the preferred embodiment may implement a full-scale deflection of approximately ±1.8V from the wobble slice level 168. The ±1.8V level equates to the outer limits VPOS_SLICE_DAC and VNEG_SLICE_DAC. With the output VTOP 257 having a peak of +0.75V above the wobble slice level 168, the difference between VPOS_SLICE_DAC and the output VTOP 257 represents the operational range of the first header slicer DAC 274, whereas the operational range of the second header slicer DAC 276 is between VNEG_SLICE_DAC and −VTOP. To avoid false triggering of header detection, VHD_POS and VHD_NEG are set marginally above the ±0.75V envelope of the wobble signal 168. Transient spikes 310–316 (associated with passage into, between, across or out of a header) at least peak at, and preferably clips the thresholds of VHD_POS and VHD_NEG, with the transient spike 310–316 causing simultaneous generation of pulses 300–306 on either of the outputs HDPOS or HDNEG. The sequence of the pulses 300–306 on HDPOS and HDNEG, as shown in FIG. 8, are indicative of a transition from a grooved data sector to a land data sector.

The sliced wobble signal 168 and the HDPOS and HDNEG pulses are passed to a header detector state machine, such as realized by software or a dedicated processor. An applicable state machine may be represented in FIG. 5 as a combination of elements including the wobble detection logic 180 and the header read controller 190. The purpose of the state machine may be to generate a trigger pulse at the beginning of every header region. The header region may be defined as the first header in any complementary pair of headers (e.g., headers 32 and 33 of FIG. 2).

Figure 9:
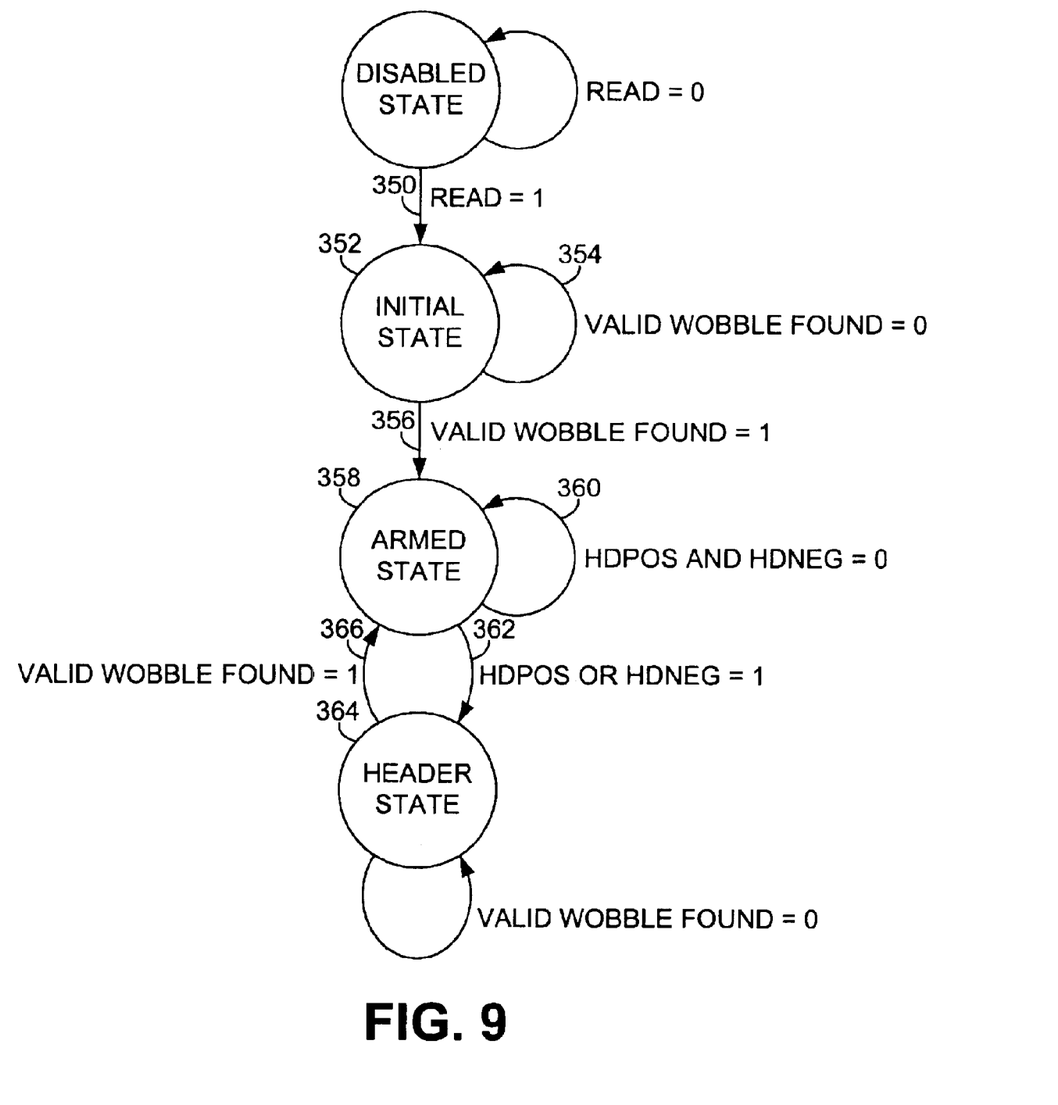
FIG. 9 is a header detect logic state machine flow diagram according to the present invention.

A state transition diagram for the state machine flow is shown in FIG. 9. The state machine is enabled when the READ input is high, indicating that the device (e.g., a machine supporting a DVD multi-architecture) is in a read mode 350. After the assertion of the READ input, the state machine will enter the initial state 352 and remain 354 until detection of the presence 356 of a valid wobble sequence.

The presence 356 of a valid wobble sequence is detected by monitoring the period between positive edge transitions of the sliced wobble stream (168 of FIG. 5) and counting time intervals using a faster clock. No phase locked relationship between the clock and sliced wobble stream 168 is assumed. In a preferred embodiment, when 4 or more consecutive period counts agree within a predetermined tolerance, then a valid incoming wobble stream is assumed to be present. However, a particular number of consecutive periods may be varied. Validity is determined so as to allow time for the front-end analogue circuitry to arrive at the correct convergence points for the slice thresholds after the assertion of READ.

Once a valid wobble stream has been determined to be present, the state machine may arm to "look for a header" (e.g., the armed state 358). The state machine will remain 360 in the armed state 358 until an input pulse is received either on the HDPOS or HDNEG inputs from the analogue header slicer circuit 182.

Once a pulse 300–306 is received 362 on either the HDPOS or HDNEG input, the state machine enters the header state 364. In the header state 364, all subsequent pulses on the HDPOS and HDNEG inputs are ignored until the state machine transitions back 366 into the armed state. Subsequent pulses are ignored, since the bandpass wobble signal will become indeterminate during the header region. The state machine will remain in the header state 364 until a valid wobble sequence is detected again, at which point the sate machine may revert to the armed state 358. When in the armed state 358, the state machine also notes which of either a HDPOS or HDNEG input activates first on the onset of a header region. The information is used to identify whether a succeeding data sector is land or groove.

Figure 10:
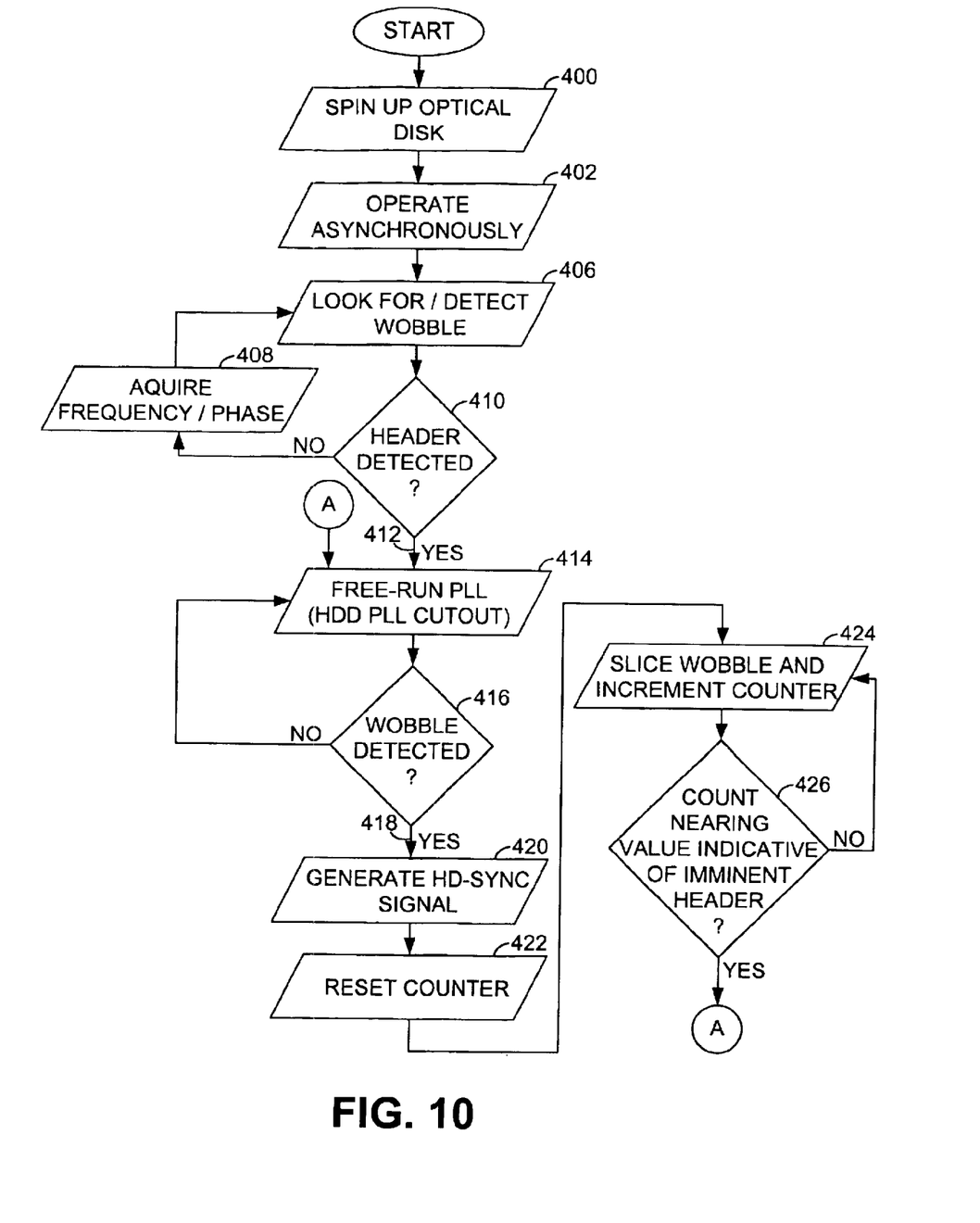
FIG. 10 is a flow diagram of a preferred operating methodology employed by the present invention in acquiring phase lock.

The process of the state machine can also be understood with regard to the flow diagram of FIG. 10. Initially, at disc spin-up 400, the system (such as a DVD-RAM, DVD-multi or other appropriate type system) operates in an asynchronous mode 402 before phase lock is acquired. During spin-up, the header index at the beginning of the disc is read to obtain/display address information or an index. Therefore, the device/system of the present invention is free-running at an arbitrarily selected frequency. At a particular point, the wobble signal is identified 406 by the wobble detector 180 and frequency and phase acquisition in the wobble PLL 179 is allowed to commence.

However, upon detection 410–412 of a header region, the phase acquisition is suspended 414 and the wobble PLL 179 is prevented from moving off-phase or off-frequency (e.g., the output of the wobble PLL is held). At re-detection 416–418 of the wobble signal 164, the wobble PLL 179 returns to phase acquisition/maintenance and the process continues in an on-off operational mode determined by the presence or absence of a valid wobble signal. The detection of an onset of each header region places the wobble PLL 179 in a free-run mode until the header region has passed, thereby reducing the likelihood that the wobble PLL will loose lock during the header regions.

With the re-detection of valid wobble, the wobble detector 180 also provides 420 a control signal to the header read controller 190 that may instigate and synchronize circuit operation. For example, the header read controller 190 may generate a counter reset 422 and control signal HD_SYNC 194 to cause the counter 196 to both reset and start over-sampling wobble periods to increment 424 an internal count. In general, so long as the counter is operational, the wobble PLL 179 is operational.

In a particular aspect and embodiment of the present invention, the HD_SYNC header synchronisation pulse is used as a trigger for PLL operation. It will be appreciated that the HD_SYNC header synchronisation pulse is triggered at a time delayed from the first pulse on either the HDPOS or HDNEG outputs, the time delay being the difference between the first pulse and confirmation that a valid wobble has been re-established. Many aspects of DVD-RAM read circuitry (e.g., VGA gain, DC restoration values, PLL etc.) need to be switched during the header boundaries. The switching of such circuitry is controlled by header read controller 190. The headers are accurately stamped across the optical medium.

A system employing the counter 196 clocked by both the sliced wobble sequence and the oscillator clock (which may run at 186× the rate of the wobble stream) to predict 426 the onset of the next header region. The system of the present invention can predict the next header and disable the wobble PLL slightly in advance of header region boundaries. Specifically, when the count associated with over-sampling the sliced wobble approaches 426 a value indicative of an imminent header then the wobble PLL 179 can be placed in the free-running mode (e.g., suspended phase acquisition).

The predictive aspect of the system circumnavigates problems that otherwise exist in schemes where a change in the signal due to the onset of a header is required to be detected before control signals for the header region can be issued. The control of the counter settings are also made available to the user such that user control can be exercised on the switching of the control signals. The counters are reset with every HD_SYNC header synchronisation pulse. The counter 196 effectively controls operation of the wobble PLL 179 for the majority of time.

The present invention identifies a wobble window in which the PLL can only acquire phase acquisition. An aspect of the invention utilizes a counter to predict successive header regions to improve synchronisation and avoid minor disruptions to the PLL induced by over-running a subsequent header. The use of the counter is, however, preferred and the system may operate (in a sub-optimum way) by reacting to header detection to suspend wobble PLL operation.

Figure 11:
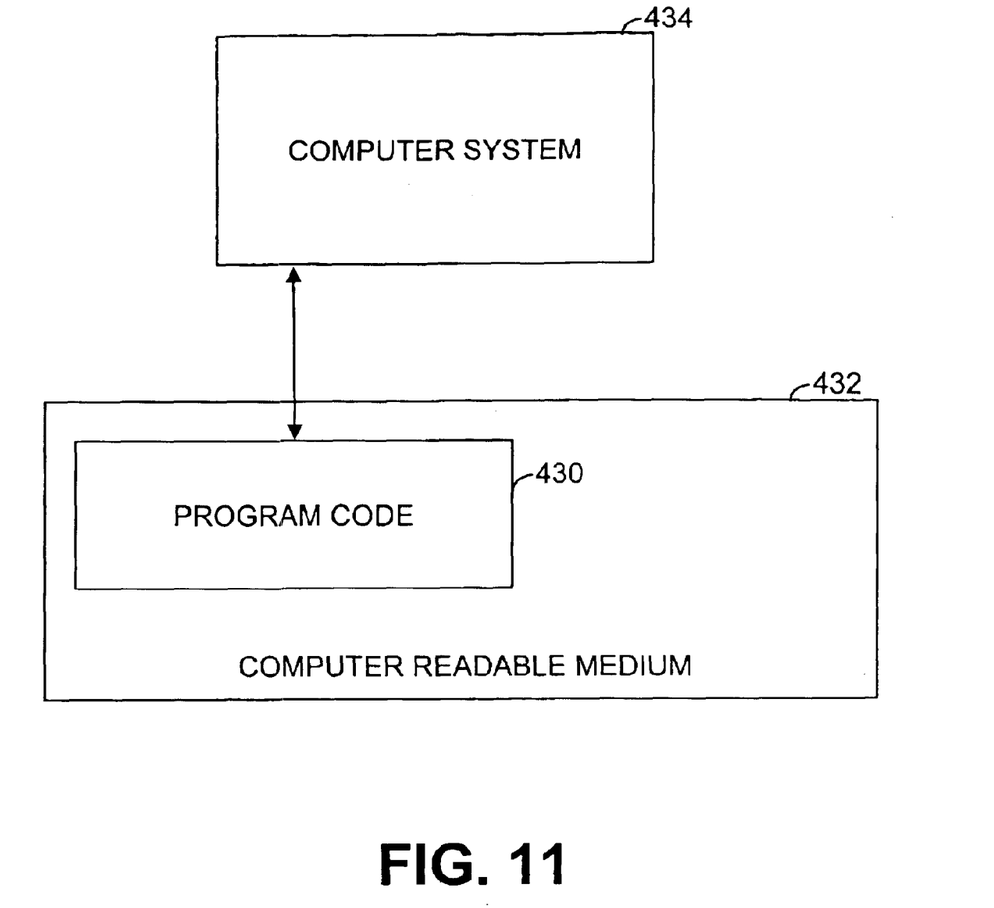
FIG. 11 is a diagram of an alternative embodiment of the invention.

Referring to FIG. 11, alternative embodiments of the invention may be implemented as computer program code 430 encoded on a computer program or readable medium 432 for use with a computer system 434. It is expected that such a computer program product may be distributed as a removable medium with accompanying printed or electronic documentation, preloaded with the computer system 434 or distributed from a server or electronic bulletin board over a network (e.g., the Internet or World Wide Web). A series of computer instructions can be fixed either on a tangible medium or in a computer data signal embodied in a carrier wave, transmittable to the computer system 434 using wireline or wireless transmission techniques. Removable (e.g., tangible) medium may be a computer readable media 432, such as a diskette, CD-ROM, DVD-ROM or RAM, fixed disc, magneto-optical discs, ROMs, flash memory, magnetic or optical cards etc. The series of computer instructions embodies all or part of the functionality previously described herein with respect to the system.

Software embodiments of the invention may be implemented in any conventional computer programming language. For example, preferred embodiments may be implemented in a procedural programming language (e.g., "C") or an object oriented programming language (e.g., "C++").

Although the preferred operating method is realized by general or specific-purpose processor or logic circuits programmed with suitable machine-executable instructions, hardware components may possibly be used to implement certain features of the present invention. Of course, the present invention may be performed by a combination of hardware and software.

While the invention has been particularly shown and described with reference to the preferred embodiments thereof, it will be understood by those skilled in the art that various changes in form and details may be made without departing from the spirit and scope of the invention.

What is claimed is:

1. A method of synchronizing a phase lock loop to an intermittent clock signal, the method comprising the steps of:
   (A) seeking to acquire phase lock of the phase lock loop with the intermittent clock signal during a plurality of first periods of the intermittent clock signal when the intermittent clock signal is present;
   (B) timing a duration for each of the first periods;
   (C) holding the phase lock loop in a free-running state in advance of and during a plurality of second periods read from a header region on an optical disk when the intermittent clock signal is absent in response to the duration indicating an end to one of the first periods;
   (D) identifying re-emergence of the intermittent clock signal; and
   (E) seeking to acquire phase lock only after re-emergence of the intermittent clock signal has been validated.

2. The method according to claim 1, further comprising the step of:
   acquiring frequency lock in an asynchronous mode.

3. The method according to claim 1, wherein the intermittent clock signal is derived from a geometric eccentricity associated with a track on an optical disc and the geometric eccentricity is interspersed by regularly spaced header regions that disrupt the geometric eccentricity.

4. A method of synchronizing a phase lock loop to an intermittent clock signal, the method comprising the steps of:
   (A) seeking to acquire phase lock of the phase lock loop with the intermittent clock signal during a plurality of first periods of the intermittent clock signal when the intermittent clock signal is present;
   (B) timing a duration for each of the first periods; and
   (C) holding the phase lock loop in a free-running state during a plurality of second periods when the intermittent clock signal is absent in response to the duration indicating an end to one of the first periods, wherein the phase lock loop is placed in the free-running state in advance of reading a header region on an optical disk in response to the duration.

5. A method of synchronizing a phase lock loop to an intermittent clock signal, the method comprising the steps of:
   (A) seeking to acquire phase lock during periods of the intermittent clock signal;
   (B) holding the phase lock loop in a free-running state during periods when the intermittent clock signal is absent;
   (C) estimating a signal envelope for the intermittent clock signal; and
   (D) bandpass filtering an input signal to generate a plurality of spikes indicative of a transition for a header region on an optical disk.

6. The method according to claim 5, further comprising the step of:

identifying a relative signal level polarity between a first spike of the spikes and a successive spike of the spikes to identify a requirement for a phase reversal.

7. The method according to claim 5, further comprising:

filtering the intermittent clock signal in a low pass filter to generate an adaptive slice level signal capable of tracking residual near-DC variations in the intermittent clock signal.

8. The method according to claim 5, further comprising the step of:

amplifying the signal envelope and the spikes to scale the spikes relative to the signal envelope to differentiate the signal envelope from the spikes.

9. The method according to claim 8, further comprising the step of:

defining a threshold exceeding the signal envelope.

10. The method according to claim 9, further comprising the step of:

identifying commencement of the header region by equating a first transition of the spikes through the threshold as being indicative of the header region.

11. A system comprising:

a phase lock loop arranged to receive an intermittent clock signal to which the phase lock loop is to be synchronized, wherein the intermittent clock signal is derived from a geometric eccentricity associated with a track on an optical disc and the geometric eccentricity is interspersed by regularly spaced header regions that disrupt the geometric eccentricity and which each define a data sector; and a control circuit comprising a counter arranged to time the intermittent clock signal during each of the data sectors, the control circuit configured to (i) maintain operational control of the phase lock loop, (ii) determine a plurality of first periods of time when the intermittent clock signal is stable, (iii) selectively maintain the phase lock loop in a phase acquisition state during the first periods of time, and (iv) force the phase lock loop to enter a free-running state during a plurality of second periods of time when the intermittent clock signal is absent in response to time within each of the data sectors and in advance of an arrival of each of the header regions.

12. A system comprising:

a phase lock loop arranged to receive an intermittent clock signal to which the phase lock loop is to be synchronized;

a control circuit configured to (i) maintain operational control of the phase lock loop, (ii) determine periods of time when the intermittent clocking signal is stable, (iii) selectively maintain the phase lock loop in a phase acquisition state during the periods of time and (iv) force the phase lock loop to enter a free-running state during periods of time when the intermittent clock signal is absent; and a bandpass filter configured to filter an input signal to generate the intermittent clock signal and a plurality of spikes indicative of a header region of an optical disk.

13. The system of claim 12, further comprising:

a top hold feedback circuit arranged to estimate a signal envelope for the intermittent clock signal.

14. The system of claim 13, further comprising:

an amplifier configured to amplify the signal envelope and the spikes, to scale the spikes relative to the signal envelope to differentiate the signal envelope from the spikes.

15. The system of claim 13, further comprising:

a data slicing circuit configured to define a threshold exceeding the signal envelope.

16. The system of claim 15, further comprising:

a comparator arrangement configured to identify commencement of the header region by equating a first spike of the spikes transitioning through the threshold as being indicative of the header region.

17. The system of claim 16, wherein the comparator arrangement comprises a first and a second comparators configured to process opposite signal senses from the signal envelope, the first and the second comparators each providing an output to a controller arranged to identify a relative signal level polarity between the first spike and a successive spike of the spikes to identify a requirement for a phase reversal in the phase lock loop.

18. The system of claim 12, further comprising:

an array of photodiodes adapted to recover an input signal representation from an optical disc containing data segments interspersed with the header regions.

* * * * *